US008198389B2

(12) United States Patent
Soucek et al.

(10) Patent No.: US 8,198,389 B2
(45) Date of Patent: Jun. 12, 2012

(54) MOLD RELEASE COMPOUNDS USING CYCLOALIPHATIC EPOXIDE FUNCTIONALIZED POLYDIMETHYLSILOXANE COATINGS AND PHOTO-INITIATED POLYMERIZATION

(75) Inventors: Mark D. Soucek, Akron, OH (US); David P. Dworak, East Hartford, CT (US)

(73) Assignee: The University of Akron, Akron, OH (US)

( * ) Notice: Subject to any disclaimer, the term of this patent is extended or adjusted under 35 U.S.C. 154(b) by 480 days.

(21) Appl. No.: 11/753,904

(22) Filed: May 25, 2007

(65) Prior Publication Data
US 2007/0287763 A1 Dec. 13, 2007

Related U.S. Application Data

(60) Provisional application No. 60/808,512, filed on May 25, 2006.

(51) Int. Cl.
C08G 77/12 (2006.01)
(52) U.S. Cl. ........................................................ 528/15
(58) Field of Classification Search ...................... 528/15
See application file for complete search history.

(56) References Cited

U.S. PATENT DOCUMENTS

| 3,931,381 | A | | 1/1976 | Lindberg | |
|---|---|---|---|---|---|
| 5,258,480 | A | * | 11/1993 | Eckberg et al. | 528/15 |
| 5,279,717 | A | | 1/1994 | Okajima et al. | |
| 5,340,898 | A | | 8/1994 | Cavezzan et al. | |
| 5,583,195 | A | | 12/1996 | Eckberg | |
| 5,639,413 | A | * | 6/1997 | Crivello | 264/401 |
| 5,650,453 | A | * | 7/1997 | Eckberg et al. | 522/31 |
| 6,232,362 | B1 | | 5/2001 | Agars et al. | |

FOREIGN PATENT DOCUMENTS

| DE | 1901858 | 8/1970 |
|---|---|---|
| DE | 2215387 | 11/1972 |
| EP | 0082354 | 6/1983 |

OTHER PUBLICATIONS

Collins, S.H., Update: Additives that Provide Mold Release, Plastics Compounding 1983, 6(2), pp. 38-42.
Hosamani, K.M. et al, Design and Synthesis of Novel Hydrazides, Thiosemicarbazides, Oxadiazoles and . . . , Industrial & Engineering Chemistry Research 2004, 43(17), pp. 4979-4999.
Lacovara, B., Parts and Molds: A Sticky Relationship, Composites Fabrication 2000, 16(10), pp. 50-52, 54, 56, 58.
Dworak, D. et al, Synthesis of Cycloaliphatic Substituted Silane Monomers and Polysiloxanes for Photocurring, Macromolecules 2004, 37, pp. 9402-9417.
Wilks, Z.W. et al, Organic Coatings Science and Technology, John Wiley & Sons: NY 1999.
Jonsson, S. et al, Radiation Chemistry Aspects of Polymerization and Crosslinking. A Review and Future . . . , Prog. Org. Coat 1996, 27, pp. 107-122.
Crivello, J.V., Applications of Photoinitiated Cationic Polymerization in Coatings, J. Coat. Technol. 1991, 63, No. 793, pp. 35-38.
Pappas, S.P., S.P. ed., Radiation Curing: Science Technology, Plenum, NY 1992.
Ciba Specialty Chemical, News Release, Apr. 29, 2002.
ASTM D 1652-97, Standard Test Methods for Epoxy Content of Epoxy Resins, Jun. 1997.
Christenson, H.K., Interactions Between Hydrocarbon Surfaces in a Nonpolar Liquid: . . . , J. Phys. Chem. 1986, 90, pp. 4-6.
Li, D. et al, Wettability and Surface Tension of Particles, Applied Surface Thermodynamics, Marcel Drekker Inc., NY 1996, pp. 509-556.
Fuerstenau, D. et al, Characterization of the Lyophobicity of Particles by Film Flotation, Colloids and Surfaces 1987, 22, pp. 87-91.
Van Oss, C.J. et al, Interfacial Lifshitz-van der Waals and Polar Interactions in Macroscopic Systems, Chem Revs 1988, 88, pp. 927-941.
Brian, B. et al, Surface Tension of Solid-Liquid Slurries, AIChE Journal 1978, 33(2), pp. 316-318.
Kwok, D.Y. et al, Contact Angle Measurement and Contact Angle Interpretation, Adv. in Colloid Interface Sci., 1999, 81, pp. 167-249.
Berthelot, D. et al, Comptes Rend. 1898, 126, pp. 1856-1859.
Dupre, A., Theorie Mecanique de la Chaleur, Gauthier-Villars, Paris, 1969.
Mori, K. et al, Development of Polymer-Molding-Releasing Metal Mold Surfaces with Perfluorinated-Group-Containing Polymer.., Journal of Appl. Poly. Sci 2003, 90, pp. 2549-2556.
Zhao, Y. et al, Inhibition of the Surface Levelling of Thermosetting Polyester Powder Coatings Caused by Surface . . . , J. Material Sci. 2001, 37, pp. 4759-4768.
Birbaum, J.L. et al, A New Onium Salt for Cationic Photo-Curing of Epoxy Coatings and Inks, Ciba Specialty Chemicals, RadTEch2002 Presentation.
Kulshreshtha, A.K. et al, Lubricants and Mold-Release Agents Propelling Plastics to New Horizons-Part III, Popular Plastics & Packaging 1998, 43(6), pp. 77-88.

* cited by examiner

*Primary Examiner* — Kuo-Liang Peng
(74) *Attorney, Agent, or Firm* — Renner Kenner Greive Bobak Taylor & Weber

(57) ABSTRACT

The present invention is generally related to mold release compounds having improved cure times, environmental friendliness and durability that are formed from cycloaliphatic epoxide functionalized polydimethylsiloxane compounds In still another embodiment, the present invention relates to mold release compounds that are formed from cycloaliphatic epoxide functionalized poly(dimethylsiloxane-co-methylhydrosiloxane) compounds.

4 Claims, 5 Drawing Sheets

MOLD RELEASE COMPOUNDS USING CYCLOALIPHATIC EPOXIDE FUNCTIONALIZED POLYDIMETHYLSILOXANE COATINGS AND PHOTO-INITIATED POLYMERIZATION

RELATED APPLICATION DATA

This application claims priority to previously filed U.S. provisional patent application No. 60/808,512, filed on May 25, 2006 and entitled "Mold Release Using Cycloaliphatic Epoxide Functinalized Polydimethylsiloxane Coatings and Photo-initiated Polymerization", which is incorporated in its entirety herein by reference.

FIELD OF THE INVENTION

The present invention is generally related to mold release compounds having improved cure times, environmental friendliness and durability and formed from polydimethylsiloxane compounds, including compounds that are formed from cycloaliphatic epoxide functionalized polydimethylsiloxane compounds, such as cycloaliphatic epoxide functionalized poly(dimethylsiloxane-co-methylhydrosiloxane) compounds.

BACKGROUND OF THE INVENTION

The injection molding industry relies heavily on mold release agents to assure that the product can be readily removed from the mold. The release agent must have a low surface tension. Consequently, fluorinated, siloxane, or wax based compounds are typically employed. In addition to the low surface tension, other factors that contribute to a beneficial mold release are the ease of application and cure. Mold release agents are applied by a variety of methods including spraying, wiping, brushing, and flow coating. Some require a thermal cycle to fully cure the release agent, while others rely on solvent evaporation and/or ambient cure. Long-lasting mold release agents that are solvent-free, and fast-curing, are especially desirable in light of the need for more environmentally friendly products, and the time constraints bearing on many applications.

Existing mold release agents include paraffin, hydrocarbon and carnauba waxes; fluorinated polymers such as tetrafluoroethylene oligomers, hexafluoropropylene oligomers, and derivatives thereof; and triethyl[(perfluorodecyloxy)benzyl] ammonium bromide. Although the waxes are effective mold release agents, several coats must be applied before the mold can be used. Additionally, waxes generally must be reapplied after every use. Furthermore, each of the other foregoing mold release agents provide very few mold release cycles before the mold must be recoated. For example, triethyl[(perfluorodecyloxy)benzyl]ammonium bromide provides only about 3 to 5 mold release cycles, and straight-chain fluorinated surfactants provide only about 1 to 2 mold release cycles.

Silicone release coatings are used to render surfaces non-adherent to materials which would normally adhere thereto, and are widely used as coatings which release pressure-sensitive adhesives for labels, decorative laminates, transfer tapes, and the like. Such release coatings are advantageously formed by the cross-linking of epoxy functional polydiorganosiloxane silicone fluids in the presence of an ultraviolet (UV) cationic initiator. Suitable bis(aryl)iodonium salt cationic photocatalysts, for example bis(4-alkylphenyl)iodonium hexafluoroantimonate, have been disclosed in U.S. Pat. No. 4,279,717 to Eckberg et al., which is incorporated by reference herein. Another class of UV-sensitive catalyst is disclosed in U.S. Pat. No. 5,340,898 to Cavezzan et al., comprising tetrakis(perfluorophenyl) borate anions.

There remains a need for silicone release coating systems which provide faster, more efficient photocatalyzed curing of reactive epoxy functional silicones. U.S. Pat. No. 5,583,195 to Eckberg has reported synthesis and use of epoxy functional silicone polymers which have been partially or completely functionalized by a fluorescing, or a photosensitizing, or a simultaneously fluorescing and photosensitizing substituent bonded to the silicone polymer. These epoxy functionalized silicone derivatives are particularly useful for providing fluorescent dye marking compounds for determining the quality of the release coatings made therewith. In particular, Eckberg discloses reaction of an agent such as anthracene-9-carboxylate with an epoxy silicone to yield a functionalized epoxy silicone that possesses ultraviolet fluorescence activity and photosensitization activity. Such compounds are sensitizers for iodonium photocatalysts, promoting enhanced iodonium miscibility and enhanced photo cure response. Anthracenes however are expensive and therefore impractical for commercial use. Accordingly, there remains a continuing need in the art for commercially viable methods for the derivatization of epoxysilicones which will yield compounds of higher reactivity and excellent adhesion release coating properties.

U.S. Pat. No. 6,232,362 to Agars et al. teaches cycloaliphatic epoxide functionalized polydimethylsiloxane (CEF-PDMS) mold release agents that are UV photocurable. The photosensitized silicones are prepared via the reaction of a photosensitizing molecule containing at least one acid functionality or one convertible to an acid functionality with an epoxysilicone via an acid catalyzed oxirane ring opening reaction. This is achieved using a photosensitizing naphthalene substituent.

SUMMARY OF THE INVENTION

The present invention is generally related to mold release compounds having improved cure times, environmental friendliness and durability formed from cycloaliphatic epoxide functionalized polydimethylsiloxane compounds. In another embodiment, the present invention relates to mold release compounds that are formed from cycloaliphatic epoxide functionalized poly(dimethylsiloxane-co-methylhydrosiloxane) compounds.

DETAILED DESCRIPTION OF THE INVENTION

Figure 1:
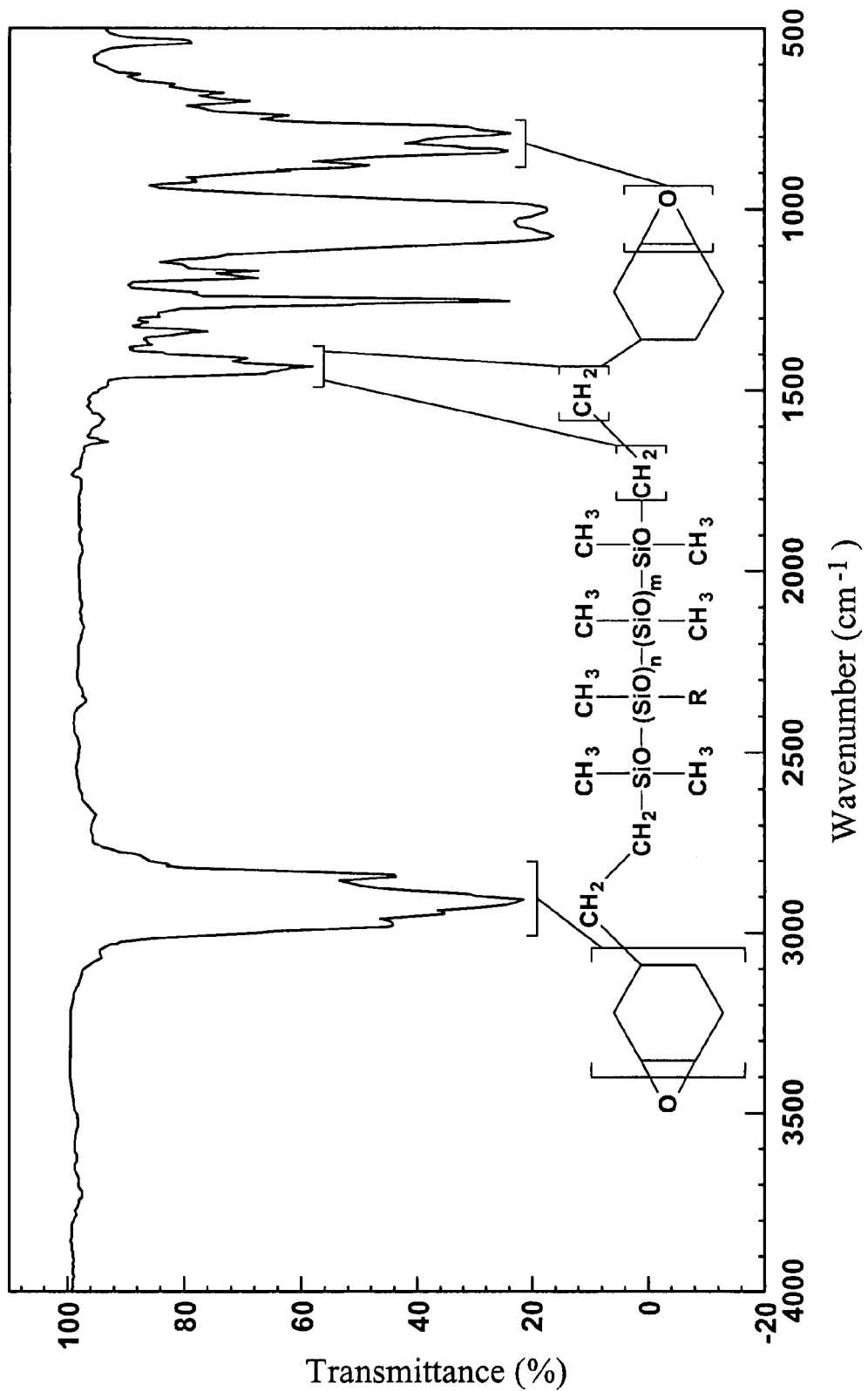
FIG. 1 is a graph showing the FT-IR Spectrum of Cycloaliphatic Epoxide Functionalization of Poly(dimethylsiloxane-co-methylhydrosiloxane), Hydride Terminated.
Figure 2:
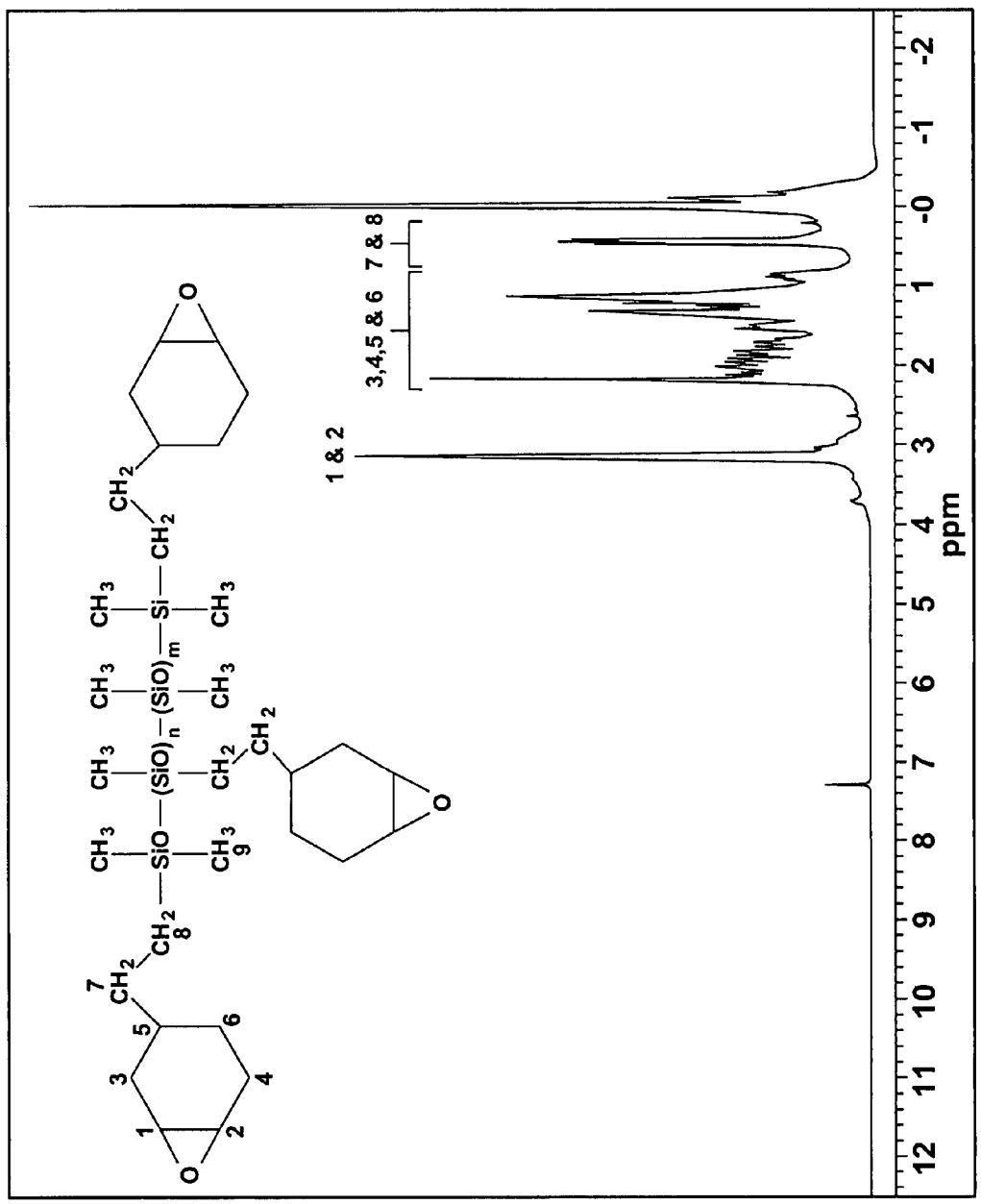
FIG. 2 is a graph showing a proton NMR Spectrum of Cycloaliphatic Epoxide Functionalization of Poly(dimethylsiloxane-co-methylhydrosiloxane), Hydride Terminated.

The present invention is generally related to mold release compounds having improved cure times, environmental friendliness and durability. In one embodiment, the present invention relates to mold release compounds that are formed from polydimethylsiloxane compounds. In another embodiment, the present invention relates to mold release compounds that are formed from cycloaliphatic epoxide functionalized polydimethylsiloxane compounds. In still another embodiment, the present invention relates to mold release compounds that are formed from cycloaliphatic epoxide functionalized poly(dimethylsiloxane-co-methylhydrosiloxane) compounds.

In one embodiment, a process for creating and/or producing the siloxane compounds of the present invention involves the hydrosilation of high molecular weight polysiloxane. Furthermore, in one instance, the process of the present invention can provide a fully functionalized polymer that can be confirmed through FT-IR and NMR analysis. The use of an acid catalyzed ring opening polymerization process permits one to control the molecular weight of the polymer being produced via the length of the reaction process. As mentioned above, the mold release agents/compounds of the present invention are able to be cured via the use of UV- and visible-light. This is advantageous over mold release agents/compounds that rely on solvents, particularly VOC, to cure. The use of pho- In one instance, cycloaliphatic epoxide functionalized polydimethylsiloxanes are coated onto a gel-coated fiber glass substrate and cured using two different light sources: UV light and visible light. Curing is accomplished through the use of an acid generating photoinitiator and a photosensitizer is used to shift the initiating wavelength into the visible region. The release potential, mechanical properties, surface tension, and contact angle of the crosslinked polymer are measured. The contact angle and surface tension of the UV cured coatings are found to be 103°±0.05 and 10.93±0.05 mJ/m$^2$, respectively. The contact angle and surface tension of the visible light cured coatings are 102° and 11.42±0.05 mJ/m$^2$, respectively. Pull-off adhesion tests reveal that a consistent 0.2 MPa of normal force is required to remove the mold from both the UV and visible light cured coatings even after 30 releases. Both methods of cure offer the same release properties, but the visible light sample require a much longer cure time.

In one instance, poly(dimethylsiloxane-co-methylhydrosiloxane) is prepared through an acid catalyzed ring opening polymerization process, as shown in Reaction Scheme 1.

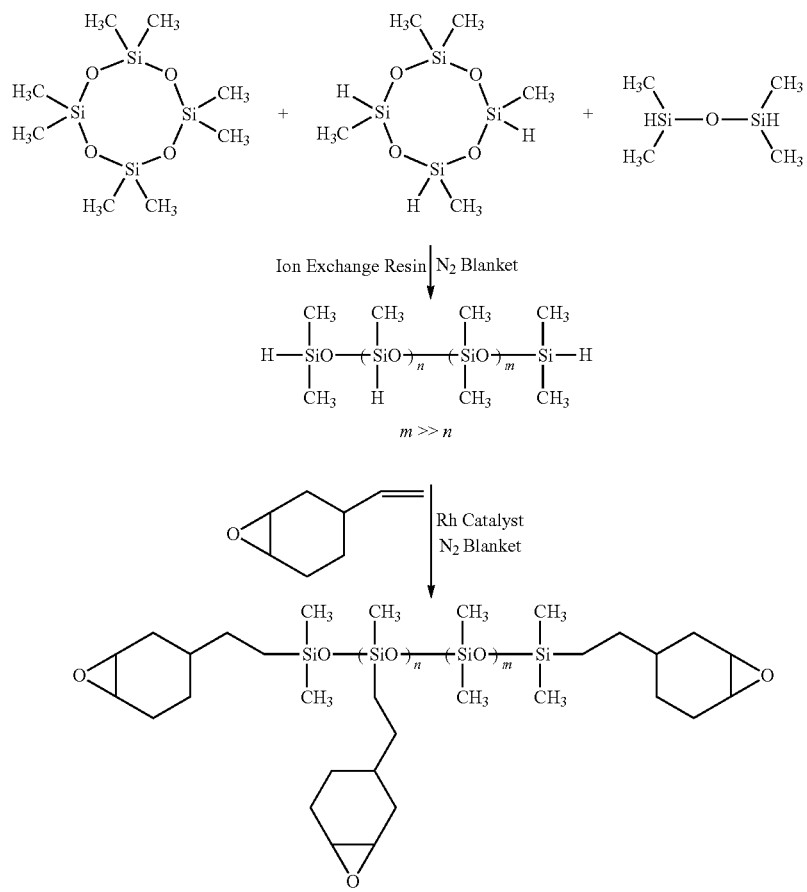

tosensitizers makes it possible to use photoinitiators that were intended for UV-cure to be used for visible cure as well. The low surface tension, extreme flexibility, and durability of coatings formed from the compounds of the present invention enable multiple releases, and imparts resistance to normal wear.

The hydride is further modified by hydrosilation to afford a cyclohexene oxide group. The cycloaliphatic epoxide provides a crosslinking site for cationic UV and visible light cure. The overall structure is determined to be a random block copolymer composed of 'D' units (R—Si—R) and the desired cycloaliphatic epoxy functionality. 'D' corresponds to a difunctional silicon atom (Si—(O$_{1/2}$)$_2$R$_2$, where R=CH$_3$. $^1$H and $^{29}$Si NMR spectroscopy in addition to FT-IR analysis is performed on hydride functionalized polysiloxane. A diagram illustrating the photo-induced homopolymerization is shown in Reaction Scheme 2.

Reaction Scheme 2

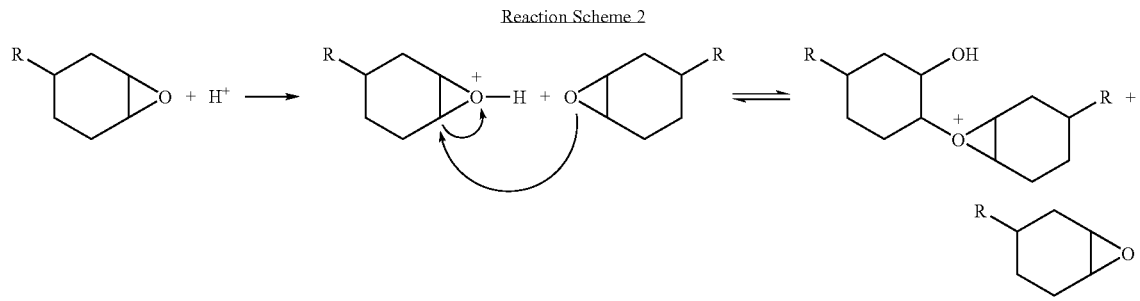

Cationic photoinitiators can be selected from iodonium and sulfonium salts of very strong acids, but are not limited thereto. A photoinitiator consistent with the present invention is IRGACURE 250, which is Iodonium or (4-methylphenyl) [4-(2-methylpropyl)phenyl]-, hexafluorophosphate(1-) (IRGACURE is a trademark of Ciba, and can be obtained from the same). Advantageously, this initiator lacks hazardous byproducts often produced during the curing step. Additionally, it is also free of heavy metals such as arsenic and antimony. IRGACURE 250 is a liquid, which allows for an easier dispersion in the polymer. One of skill in the art will understand that a wide variety of initiators are consistent with the present invention, and thus, the present invention is not limited to just those initiators discussed herein. The photoinitiators are employed in an effective amount, preferably about 0.001 to 10 percent by weight based upon the weight of the polymer.

Photosensitizers can help to shift the initiating wavelength from the ultraviolet (UV) to the visible range. This allows for a broader range of curing wavelengths to be explored, especially if certain wavelengths are blocked by filler or pigments. Strong acids such as H$_2$SO$_4$ or HCl cannot be used since the conjugate bases are nucleophilic enough to attack a protonated epoxy group, which prevents flier polymerization. Photosensitizers within the scope of the present invention include, without limitation, anthracene, phenanthrene, methylene blue, phthalocanine, carbazoles or any combinantion thereof. They are used in an effective amount, which would be about 0.01 to about 10 percent by weight based upon the weight of the polymer, preferably in an amount 0.05 to 0.10 percent by weight.

Materials

Octamethylcyclotetrasiloxane, 1,3,5,7-tetramethylcyclotetrasiloxane and 1,1,3,3-tetramethyldisiloxane can be obtained from Gelest, Inc. and is used as supplied. Wilkinson's catalyst (chlorotris(triphenylphosphinc) rhodium), anthracene, AMBERLYST 15 ion-exchange resin, and 4-vinyl-1-cyclohexene 1,2-epoxide can be obtained from Aldrich and are used as supplied. Toluene, supplied by Aldrich Chemical Co., is distilled and stored over molecular sieves (4A, beads, 8-12 mesh). IRGACURE 250 is supplied by Ciba Specialty Chemicals and is used as received. SS4177 can be obtained from GE Silicones and is used as received. Air sensitive materials are transferred and weighed in a dry box under argon.

Instruments

Proton NMR spectra are obtained from a Gemini-300 spectrometer (Varian), while silicon NMR spectra are recorded on a Gemini-400 spectrometer (Varian). All NMR samples are prepared in CDCl$_3$ and recorded at 20° C. Chemical shifts are given relative to a TMS internal standard. FT-IR spectra are obtained on a Mattson Genesis Series FT-IR. A Waters system is used for gel permeation chromatography (GPC) analysis. Contact angles are measured on an oscillating bubble rheometer equipped with an image capture video system. Absorption spectra are recorded on a Hewlett-Packard 8453 diode-array spectrophotometer.

Sample Preparation and Testing

For adhesion testing, a solution of polymer and 3% (w/w) photoinitiator, IRGACURE 250, is prepared and wiped onto gel coated fiberglass composite panels. A Fusion UV curing chamber with a belt speed of 55 ft/min is used to cure the coatings with a UV source (mercury arc 'H' bulb, 150 mW/cm$^2$). Anthracene (0.05% w/w) is added, as a photosensitizer, to the prepared solution in order to cure the film with visible light. A 150 Watt bulb is placed about six inches above the substrate, which is exposed for 15 minutes. All samples are allowed to stand for approximately one hour to allow dark cure to complete before testing begins. A polyester resin/curing agent is mixed and generously applied (about 3 to 5 g) to the cured film, to simulate a molding compound, and allowed to cure for 24 hours before adhesion testing. Tests are conducted on the mold release while the simulated mold cures under pressure. The mold is pressed between two coated fiberglass composite panels with a force of 90 N and allowed to cure.

Visible light cured coatings having a thickness greater than 1 mil are placed under an ordinary household 150 Watt incandescent light bulb for six hours to assure complete cure. The films are then allowed to stand for an additional hour after the light source was removed. Taber abrasion is performed in conformance with ASTM D 4060-95 on 3 mil films with a CS-10 standardized abrasion wheel under 250 g of weight. Pull-off adhesion (ASTM D 4541-02), pencil hardness (ASTM D 3363-00), Reverse impact (ASTM D 5420-04), and conical mandrel bend (ASTM D 522-93a) are performed on 3 mil thick films cured on aluminum Q-panels (3×6 in$^2$). A quantity of SS4177 is cast (1 mil) on aluminum Q-panels (3×6 in$^2$) an placed in an oven at 110° C. for five hours to fully cure.

Cycloaliphatic Epoxide Functionalization of Prepared Poly (dimethylsiloxane-co-methylhydrosiloxane), Hydride Terminated To a three-neck round bottom flask, equipped with a reflux condenser and nitrogen inlet/outlet is added poly(dimethylsiloxane-co-methylhydrosiloxane), hydride terminated (30 g), 4-vinyl-1-cyclohexene diepoxide (20 g, 0.18 mol), and Wilkinson's catalyst (0.004 g, 4.3 µmol). Dry, distilled toluene (30 g) is added via cannula. The reaction is held at 75° C.

in an oil bath and mechanically stirred under nitrogen. The disappearance of the Si—H functionality is monitored through FT-IR and the disappearance of the peak at about 2160 cm$^{-1}$ indicates that the reaction is complete. Any solvent and unreacted starting materials are removed under vacuum (3 to 5 mm Hg). Cycloaliphatic epoxide and alkoxy silane functionalization is confirmed/analyzed through $^1$HNMR, FT-IR analysis, and titration.

Difficulties exist in directly measuring the surface tension of a solid and as a result several independent approaches have been used such as direct force measurements, sedimentation of particles, film floatation, and contact angle. Contact angle measurements, however, are easily performed by measuring the angle a liquid drop makes on a solid surface. This prepares a cationically curable polysiloxane coating for use as a durable mold release agent. The process of this embodiment controls the molecular weight and the amount of silane functionality along the polymer backbone. This allows for regulation of the degree of functionalization along the polysiloxane chain. Various photosensitizers can be used in connection with this embodiment to expand the useful spectrum for curing.

Synthesis and Characterization

Figure 3:
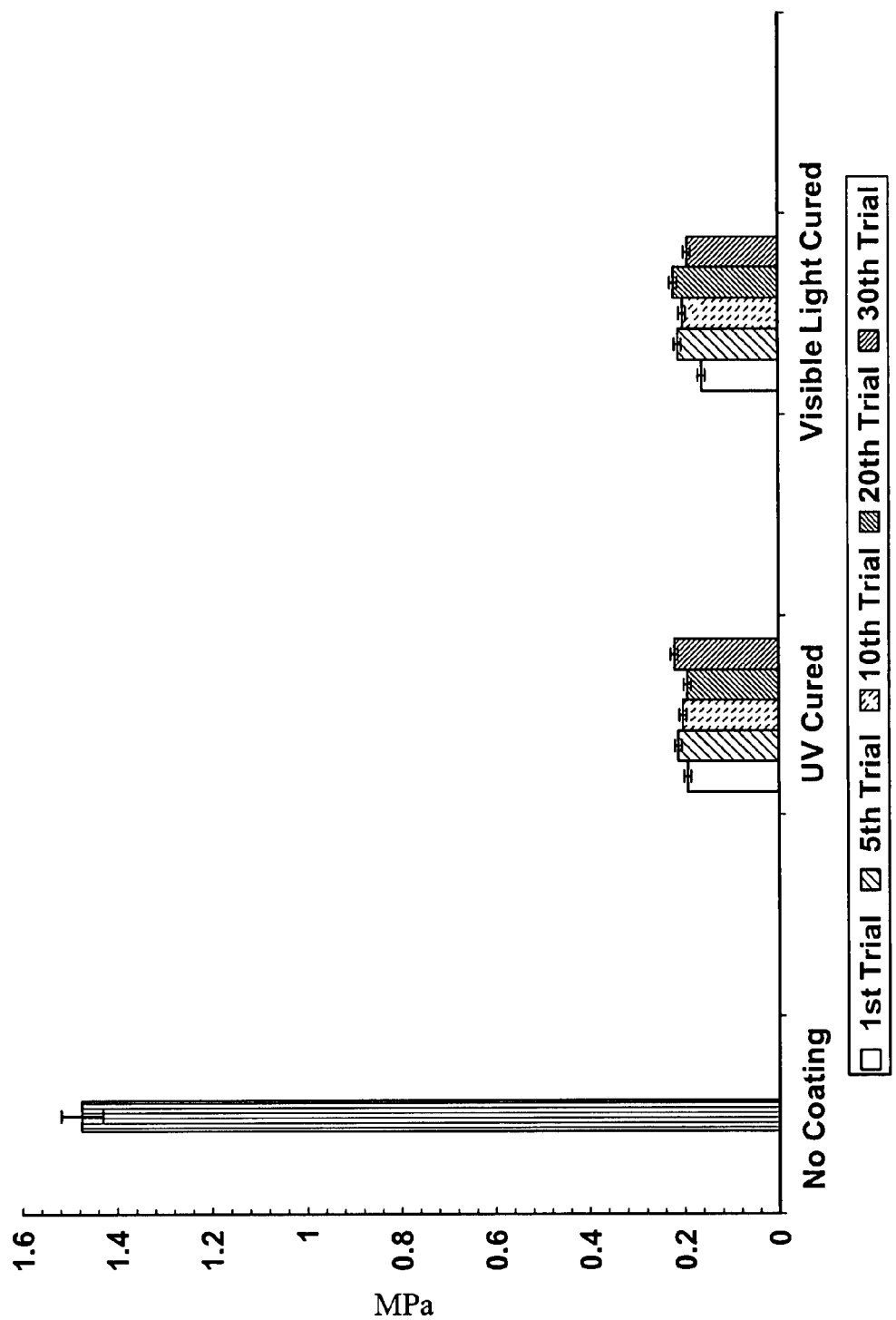
FIG. 3 is a graph showing the results of pull-off adhesion tests for UV and visible light cured films.
Figure 4:
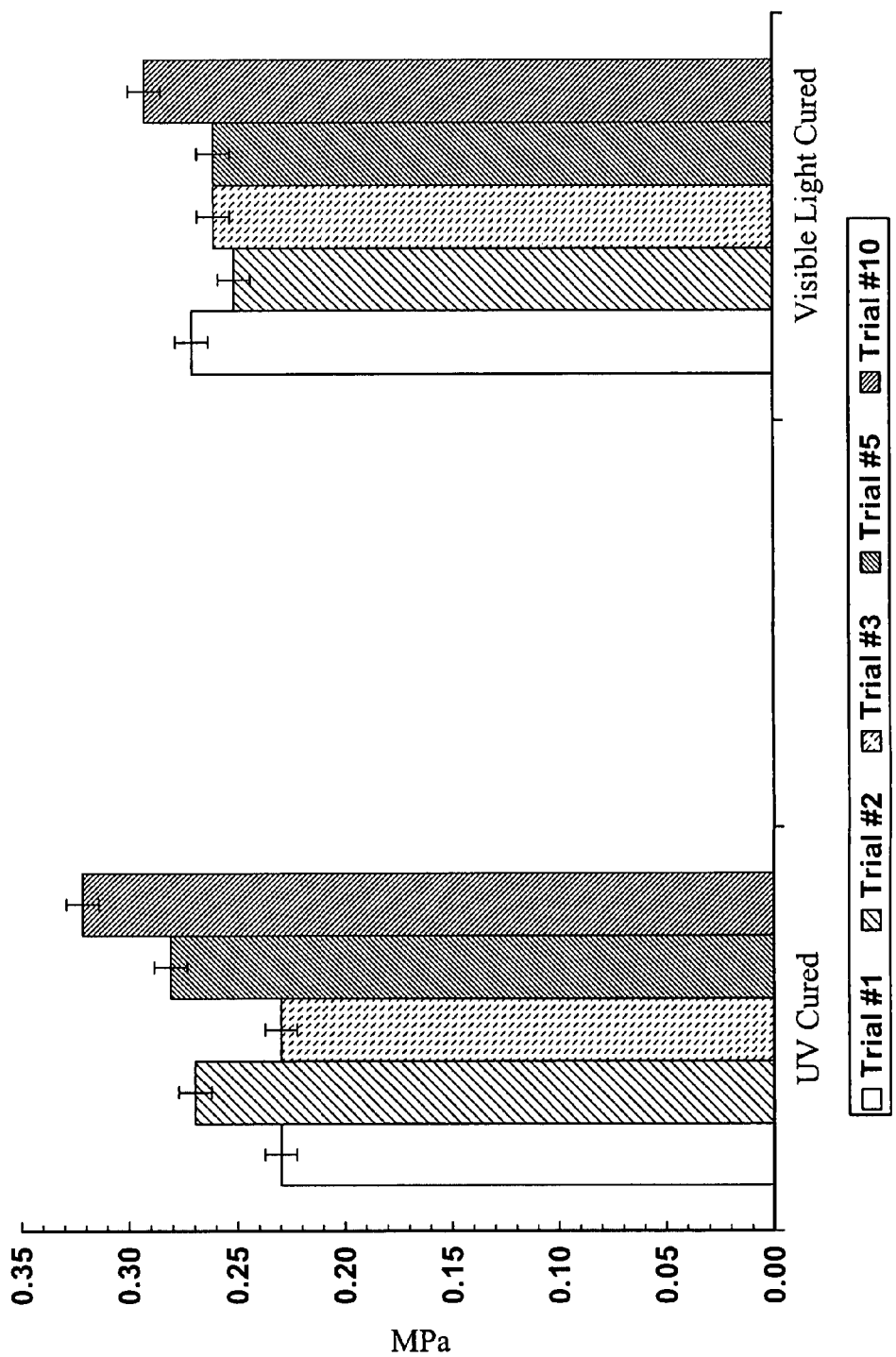
FIG. 4 is a graph showing the results of pull-off Adhesion Tests for Compressed UV and visible light cured films.

Functionalization of poly(dimethylsiloxane-co-methylhydrosiloxane) with cycloaliphatic epoxides is analyzed with FT-IR (FIG. 3) and proton NMR (FIG. 4). Both spectra show clear evidence of the epoxy ring functionalization through the disappearance of the Si—H group as well as other identifying peaks (cycloaliphatic ring, epoxy ring, and ethylene chain). FIG. 3 shows the addition of the cycloaliphatic ring near the 3000 cm$^{-1}$ region as well as the epoxy group near 700 cm$^{-1}$. The proton NMR spectra identifies the addition of the cycloaliphatic epoxide with the epoxy hydrogens near 3 ppm and the vinyl hydrogens at about δ 0.4 ppm. Titration data shows a percent epoxy of about 20.642±0.005% (w/w).

Contact Angle and Surface Tension

The low surface tension and film formation tendencies of the polysiloxane coatings are a result of the rotation of the dimethyl unit around the siloxane bond. This rotation is virtually free due to the nondirectional character of the SiO bond and the large Si—O—Si bond angle, which can range from 140° to almost 180°. This wide bond angle allows the neighboring methyl groups to have virtually no interactions with each other, which accounts for the high surface tension. Surface tension can be quantified as the force acting normal to the interface per unit length of the film at equilibrium, which also equals the surface energy (the energy required to increase the surface area of the liquid by a unit amount). The solid surface tension can be estimated from the contact angle through the use of the following equation:

$$\gamma_{lv} \cos \Theta_y = \gamma_{sv} - \gamma_{sl} \quad (3)$$

Equation (3) contains two measurable quantities, the contact angle θ and the liquid-vapor surface tension $\gamma_{lv}$; which has been found to be 72.8 mJ/m². In order to determine $\gamma_{sv}$, a relationship among the parameters must be sought. An equation-of-state relation known as the Berthelot's combining rule (equation 4), which applies a theory based on molecular interactions, can be utilized.

$$\epsilon_{ij} = \sqrt{\epsilon_{ii} \epsilon_{jj}} \quad (4)$$

A thermodynamic relationship exists between the free energy of adhesion per unit area of a solid-liquid pair being equal to the work necessary to separate a unit area of the solid-liquid interface. The result of Berthelot's rule in conjunction with Young's equation can be seen in equation (5) and the full derivation can be found in reference 11.

$$\cos \Theta_y = -1 + 2 \cdot \sqrt{\frac{\gamma_{sv}}{\gamma_{lv}}} \quad (5)$$

Consequently, it is now possible to find the solid-vapor surface tension when the experimental contact angle and liquid-vapor surface tensions are known. The solid surface tension for the contact angle of 103° and using 72.8 mJ/m² as the liquid-vapor interface is about 10.93±0.05 mJ/m² for the UV cured films. The visible light cured system has a similar surface tension surface tension of about 11.42±0.05 mJ/m² as calculated from its contact angle of 102°. The following table compares the surface tension of photo-cured polysiloxanes to other coatings.

TABLE 1

Surface Tension of Common Coatings

| Coating | Surface Tension (mJ/m2) |
|---|---|
| Epoxy | 47 |
| Polyurethane | 43 |
| Polyvinylchloride | 39 |
| Alkyd | 38 |
| Polyester (powder coating) | 33 |
| Polyethylene | 31 |
| Teflon | 18 |
| SS4177 (GE Silicones) | 14 |
| UV-Cured Polysiloxane | 11 |
| Visible-Light Cured Polysiloxane | 11 |

Compared to Teflon (18 mJ/m²), the surface tension of the photo-cured polysiloxanes is considerably less.

Mechanical Testing

Figure 5:
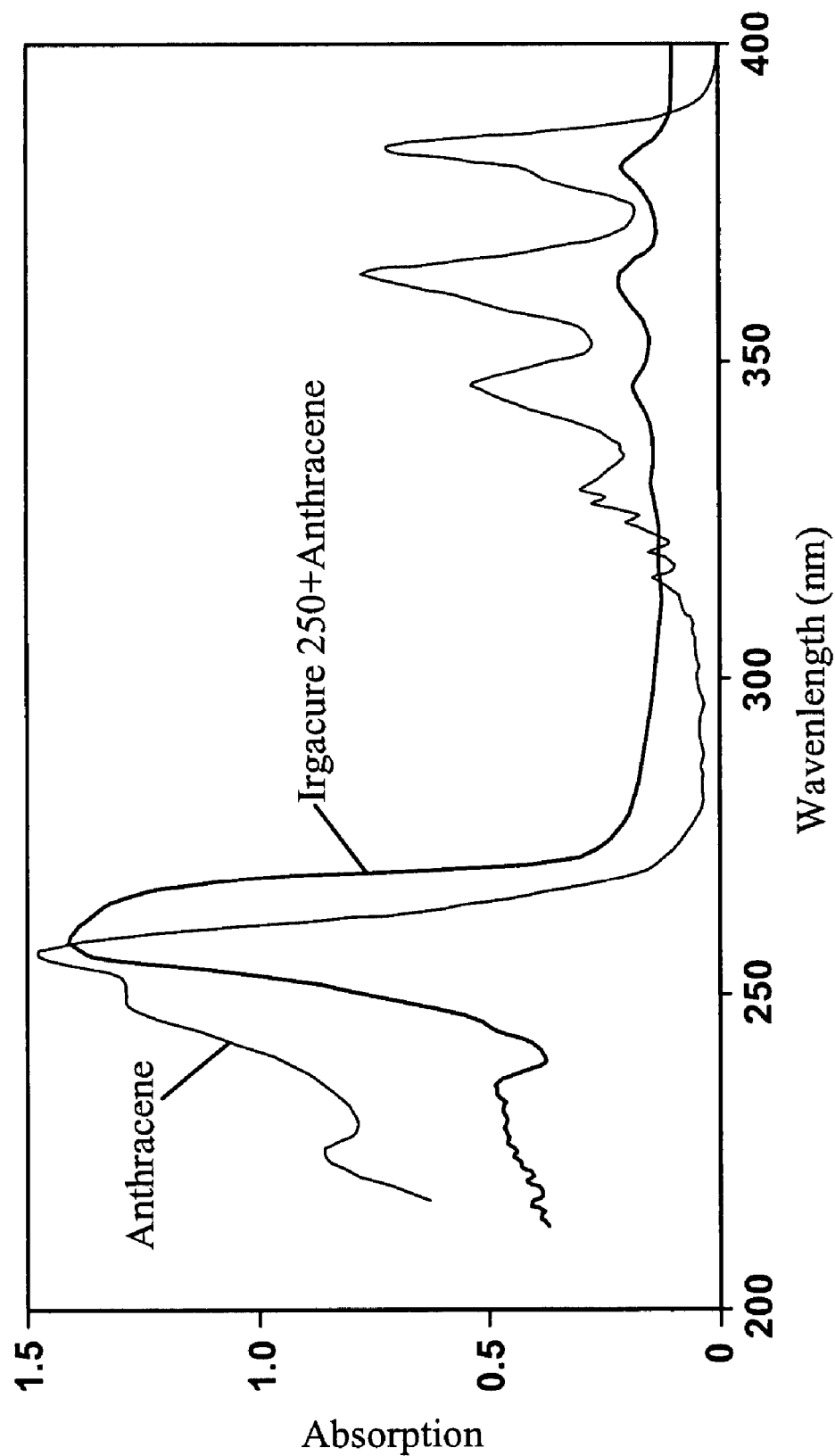
FIG. 5 is a graph showing the absorption spectra of a Photoinitiator and a Photosensitizer.

Pull-off adhesion tests are performed to quantify the release and multiple release potential of the cured film. The tests are performed using the simulated mold as the bond between the substrate and a test dowel. Subsequent testing over the same area shows that the samples cured with UV and visible light had consistent results after 30 test cycles. This is due to thorough film curing and the low surface tension (FIG. 5). Significantly, the sample having no coating experiences mechanical failure inasmuch as the gel-coat is cleaved cleanly from the glass composite. Adhesion tests are also performed using the standard ASTM epoxy resin as the adhesive between the substrate and dowel. Both the UV and visible light cured systems perform similarly in that both require an average of 0.21±0.08 MPa of normal force to remove the dowel even through the 30$^{th}$ trial.

FIG. 6 shows the required normal force for removing the panel from the compressed mold. The mold requires virtually the same amount of force as the non-compressed sample to release it from the panel. The Taber abrasion and pencil hardness tests are performed on the coatings to determine their resistance to abrasion and their hardness. The results of the tests are shown in Table 2 and demonstrate that the visible light cured, and the UV cured, coatings perform equivalently in both regards.

TABLE 2

Results of Mechanical Property Testing

| Sample | Pencil Hardness | Reverse Impact (ft/lbs.) | Conical Mandrel (% Elongation) | Taber Abrasion (cycles/mil) |
|---|---|---|---|---|
| UV Light Cured | 2H/4H | 38 | Pass | 1327 |
| Visible Light Cured | 2H/4H | 34 | Pass | 1285 |

Reverse impact and conical mandrel test results (Table 2) show that the UV and visible light cured coating are extremely flexible.

Although the mechanical tests demonstrate that the two systems perform equivalently, the visible light cured system requires substantially more time to cure. There are a variety of factors that contribute to this observation. For instance, the visible light source may not be intense enough to generate protons at a rate comparable to the UV system. Additionally, the energy of the incident visible radiation may not be high enough to generate protons at a comparable rate. Other factors include photoinitiator concentration, photosensitizer concentration, photosensitizer quantum efficiency, exposure time, and/or sample thickness.

Unlike UV curing, visible light curing conditions are not optimized for cure time. The photoinitiator exhibits absorption in the 200-235 nm region at low concentrations (0.001 wt %), but increases to near 300 run when concentrations approach 0.05 wt %. Also unlike UV curing, the visible curing method requires photosensitizers (e.g. anthracene). This is because the incident radiation is visible, but the photoinitiators absorb in the UV. Therefore, sensitizers are used to harvest visible light and transfer it to the photoinitiator.

Anthracene absorbs around 320 to 390 nm. When mixed with the photoinitiator, this strong absorption by anthracene shifts the initiating wavelength to the near visible region; however, the wavelength for photoinitation to occur is bordering the visible region (FIG. 7).

The wavelength required for initiation with the photosensitizer is obtainable from the visible light source which ranges from 380 to 740 nm. However as FIG. 7 shows the absorption near the 380 nm region is fairly weak. This accounts for the extremely long cure times. Curing can also be assisted through the UV-light that is given off from the incandescent bulb. The increase in temperature of the substrate due to extreme proximity of the light source can also aid in increased chain mobility; making cure more possible.

The ability to cure mold release agents with UV- and visible-light allows for an inexpensive and straightforward method to apply the coating to a substrate. The UV-light curing method does offer a more rapid cure time compared to the visible-light curing route. The verification that both methods of cure yield the same mechanical properties confirms that various cure methods are possible. The high surface tension of the coating and multiple release capabilities permits many cycles of injection molding without the need for reapplication. The durability of the coatings also extends the life of the coating by resisting scratches and other wear that typically result from use. The ability to make the curable mold release agent sprayable allows the compositions of the present invention to be used with more complex molds. Additionally, their extended pot life enables long term storage.

One advantage of the present invention is that the process described herein enables more efficient production of cycloaliphatic epoxide functionalized polysiloxanes. In part, this is because hydrosilation of the cycloaliphatic epoxide is straight forward and relatively inexpensive.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

What is claimed is:

1. A process of making a mold release coating compound comprising the steps of
    (A) combining and reacting hydride terminated poly(dimethylsiloxane-co-methylhydrosiloxane), 4-vinyl-1-cyclohexene diepoxide and a rhodium catalyst in a reaction vessel to yield a cycloaliphatic epoxide functionalized polydimethylsiloxane compound;
    (B) mixing the cycloaliphatic epoxide functionalized polydimethylsiloxane compound with a photoinitiator and a photosensitizer to yield a mixture;
    (C) coating the mixture on a surface to provide release characteristics; and
    (D) curing the coating with visible light,
    wherein the cycloaliphatic epoxide functionalized polydimethylsiloxane compound is functionalized with at least two cycloaliphatic epoxides with at least one cycloaliphatic epoxide being located on a terminal silicon atom and at least one cycloaliphatic epoxide being located on an internal silicon atom.

2. The process of claim 1, wherein the photoinitiator is selected from iodonium, sulfonium salts of very strong acids, and mixtures thereof.

3. The process of claim 1, wherein the photosensitizer is selected from anthracene, phenanthrene, methylene blue, phthalocanine, carbazoles and mixtures thereof.

4. The process of claim 1, wherein the photosensitizer is present in an amount of 0.01 to 10 percent by weight.

* * * * *